W. H. WRIGHT.
SPEED GOVERNOR.
APPLICATION FILED SEPT. 27, 1910.
1,057,909.
Patented Apr. 1, 1913.
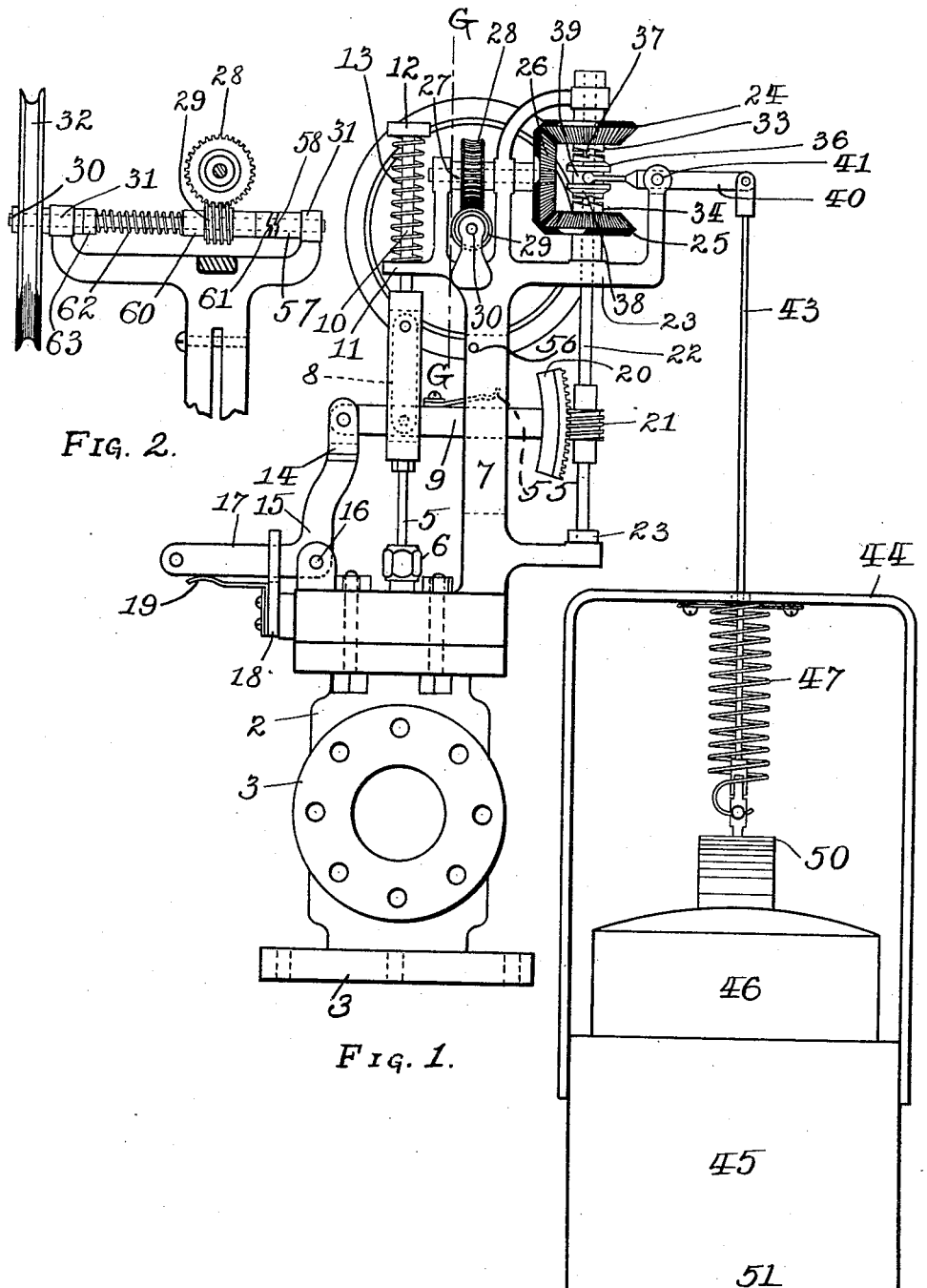

UNITED STATES PATENT OFFICE.

WILLIAM H. WRIGHT, OF DULUTH, MINNESOTA.

SPEED-GOVERNOR.

1,057,909.  Specification of Letters Patent.  Patented Apr. 1, 1913.

Application filed September 27, 1910. Serial No. 584,061.

*To all whom it may concern:*

Be it known that I, WILLIAM H. WRIGHT, a citizen of the United States, residing at Duluth, in the county of St. Louis and State of Minnesota, have invented a new and useful Improvement in Speed - Governors, of which the following is a specification.

My invention relates to improvements in speed governors, and has as its principal object, a device that will regulate the speed of an engine or other prime mover to maintain a constant pressure or suction in a pump operated by the engine, and to do this regardless of variable steam pressures in the engine and variable conditions that affect the required work of the pump in maintaining a constant head. The work required of a constant pressure pump is affected by a number of conditions, such as the internal friction of the pumping machine, variable consumption from the pump and friction in the pressure pipes. Numerous devices have been designed to accomplish this result of which the majority aim to secure it through the uniform speed of engine revolution, and in all of them the governor valve is directly connected to the sensitive member which initiates the change and which must therefore perform the work of opening or closing the governor valve, through levers or gearing. This necessity reduces the sensibility of the device, while the requirements of constant pressures to be maintained by a pump are not met at all by the regulation of the engine speed. In all such devices the static friction of the governing parts requires so great an initial force in the governor, both in increasing and decreasing the power that its sensibility is diminished. In governors commonly in use the sensitive member, being directly connected to the throttling mechanism, has a fixed relation to the throttle. A certain position of the sensitive member corresponds to a certain position of the throttle and changes in the sensitive member due to changes in pressure can only partially compensate for this change.

In my invention the pressure or suction which is to be maintained constant is utilized to initiate the movement that regulates the engine driving the pump. The power required for this regulation is taken direct from the engine itself, and can be thrown off at any time without friction by a peculiar action of the clutch which will be described in detail. By the aid of my device a substantially constant head may be maintained at any given point in a pressure line, regardless of the distance from the pump, since the pressure at that point is used to initiate the regulation of the pumping engine. These peculiar features of regulation, I consider, new as well as the structure in which I have embodied them and which I have illustrated in the accompanying drawings.

In these drawings, Figure 1, is an elevation of my device showing its use in connection with a gasometer or vacuum tank, and Fig. 2 is a section on the line G—G, Fig. 1, showing the clutch release.

In the above drawings is shown a governor valve chamber 2 of common construction, having flanges 3 for attachment to a steam main. A governor valve operates within the valve chamber and has a stem 5 passing out through the stuffing box 6 in the frame 7 which is attached to the valve chamber. The valve stem extends upward, carrying the pivot bearing 8 for the lever 9 and forming a guide 10 which passes through the lug 11 on the frame and terminates in the head 12 confining the coiled spring 13 between the head 12 and the lug 11. The lever 9, is pivoted at its end to one arm 14 of the bell crank 15 which is hinged in a vertical plane at the point 16 on the frame. The other arm 17 of the bell crank passes through a slot in a guide 18 which limits its motion and presses down against a spring 19, the guide and spring being both mounted on the frame of the governor. At its free end the lever 9 carries a segmental gear or rack 20 which meshes with a worm 21 on the vertical shaft 22. The spring 19 serves to maintain the rack and worm in perfect mesh. The shaft 22 has bearings in the frame 7 at the points 23 and carries the loose reversing bevel gears 24 and 25 in mesh with the upper and lower faces of the gear 26 which is mounted on the shaft 27, journaled on the frame. The shaft 27 carries a worm wheel 28 meshing with a worm 29 on the shaft 30 which is mounted in bearings 31 on the frame, and operated by the sheave 32 which may be belted to the engine in any suitable manner.

The hubs of the gears 24 and 25 are fitted with clutch boxes 33 and 34 between which lies a counterpart box 36 keyed to the shaft 22 by a feather and having opposite faces 37 and 38 fitted to engage the clutch boxes 33 and 34. The box 36 is operated into and out of engagement with the clutch boxes 33 and 34 by means of the trunnion 39 and the lever 40 which is pivoted on the frame at the point 41. To this lever is hinged a rod 43 which passes down through an arm 44 attached to the tank 45 of the gasometer, and is attached to the top of the float 46 in which the vacuum is to be maintained. A coiled spring 47 attached to the arm 44 and to the lower part of the rod 43 serves to overcome the weight of the float and of the weights 50 on the top of the float which are used to oppose the action of the spring and adjust the position of the float under different required degrees of suction. The tank 45 is supported on a standard 51 and the suction is maintained by any suitable pump acting through the suction pipe 52, and operated by the engine in connection with the governor valve. The required suction in the gasometer and the adjustable weights are balanced against the spring 47 so that the rod 43 and lever 40 maintain the sleeve 36 out of engagement with the reversing gears 24 and 25. Therefore so long as the suction furnished by the pump remains constant, the shaft 22 will not be operated and the governor valve operated by the lever 9 will remain stationary. When for any reason the suction in the gasometer increases, the spring will be extended and the sleeve 36 will be thrown into engagement with gear 24. If the suction decreases, the sleeve will be thrown into engagement with gear 25. These changes may occur through either the action of the pump or changes in the steam pressure on the engine. Since the gears 24 and 25 travel in opposite directions, the shaft and worm will be operated in one direction or the other according as the sleeve 36 engages with one or the other gear, and the worm acting on the lever will open or close the governor valve changing the steam supply to meet the requirements of the exhauster pump. The action of the valve is limited only by the rack 20 and in case the rack travels entirely off the worm 21 in either a downward or upward direction, the rack is held in contact with the worm by the spring 13 acting upward and the spring 55 upon the lever 9 which is designed to be stronger than the spring 13 and which presses against a stop 56 on the frame when the lever 9 is near its upper limit. In this way the worm 21 upon reversing will at once engage the rack 20.

It will be readily seen that the only force which the suction on the gasometer has to overcome in initiating the governor's regulative action, is the friction in the clutches on the box 36 and the gears 24 and 25, and this friction in itself would tend to a vibratory action of the governor. To overcome this friction I have so designed my device that the drive of the clutch boxes is momentarily reversed at frequent intervals allowing the counterpart box 36 actuated by the rod 43, to disengage without opposition. If the tendency of the suction remains in the same sense at the moment of reversal, the box 36 will remain in position to engage the gear when it resumes its motion, but if for any reason the suction requires regulation in the opposite sense, or if the suction has reached the predetermined point at which it balances the spring, the box 36 will disengage from the gear with which it has associated and move into engagement with the other gear or into the median position in which it engages with neither gear and the valve remains stationary. To secure this momentary reversal of the gear drive, I have placed on the shaft 30 a collar 57, which is stationary and connected to the bearing 31. This collar has on its free end beveled notches 58 each having an abrupt face and a beveled face extending in the direction of rotation, of the drive shaft. On the shaft is the worm 29 mounted upon a feather 60 and having continuous with it, a collar having shoulders 61 fitted to the notches in the stationary collar 57. The movement of the collar with the shaft carries the shoulders along the beveled face of the notches and causes a longitudinal movement of the collar and worm 29 upon the shaft 30. This movement is opposed by a spiral spring 62 interposed on the shaft between the worm 29 and the collar 63 also carried on the shaft. The movement of the worm longitudinally on the shaft compresses this spring and when the shaft has advanced sufficiently in rotation so that the shoulders 61 may fit into the next succeeding notches 58, forces the worm 29 longitudinally in the reverse direction. This longitudinal movement of the worm upon the shaft produces in substance an increasing and decreasing pitch in the worm 29 and a consequent advance and retardation of the worm wheel 28 in which the worm meshes. The depth of the notches 58 in the collars is made such that the retardation results in a momentary reversal of the worm wheel 28 and consequently of the driving clutches, allowing disengagement of the box 36.

It will be readily understood that my device may be adapted to other forms of engines besides a steam engine and in place of the throttling valve illustrated, there may be used any form of throttle adapted to the form of engine or prime mover to which the governor is to be attached, and in place of the gasometer illustrated any other function of operation may be used to initiate the regulation of the motive agent.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In a governor valve operating mechanism, a pair of reversing drive clutches, an operating clutch disposed between said drive clutches, means for automatically engaging said operating clutch with said drive clutches, and means for momentarily reversing the direction of motion of the drive clutches, whereby the operating clutch is adapted to be freed from said drive clutches, for the purposes specified.

2. In a governor for engine pumps, a drive clutch operated by said engine, a governor valve adapted to regulate said engine, a pressure gage on said pump adapted to be operated by changes of the pressure maintained by said pump, an operating clutch fitted to said drive clutch and controlled by said pressure gage and adapted to operate said governor valve, and means for momentarily reversing the motion of said drive clutch, for the purposes specified.

3. In a governor for prime movers, the combination with a power controlling device of actuating mechanism therefor, containing normally disconnected connecting means for making and breaking its continuity, governing means actuated by the prime mover for moving said connecting means to make the actuating mechanism continuous when said governing means has been moved to either of two opposite predetermined extreme positions, and means for moving said connecting means to break the continuity of said actuating mechanism, for the purposes specified.

4. In a governing mechanism for an engine having a throttle and means for operating said throttle, a sensitive member adapted to control the engagement of said operating means and said throttle, and means for temporarily disengaging said operating means and throttle at short intervals, whereby the control by said sensitive member may be made more sensitive.

5. In a governor for prime movers, the combination with a throttle valve, of actuating mechanism and a pair of driving parts continuously operated thereby in opposite directions, a normally disconnected mechanism for connecting either of said driving parts with the valve governing means actuated by the prime mover for connecting said connecting mechanism with one or the other driving part when it has been moved to either of two opposite predetermined extreme positions, and means for temporarily disengaging said connecting mechanism; whereby the throttle valve is moved to desired position in consequence of movement of the governing means to an extreme position and is then released and is not affected by intermediate movements of the governing means.

In testimony whereof, I have signed my name to this specification, in the presence of two subscribing witnesses.

WILLIAM H. WRIGHT.

Witnesses:
LUCIEN A. BARNES,
R. C. WEDDELL.

Copies of this patent may be obtained for five cents each, by addressing the "Commissioner of Patents, Washington, D. C."